United States Patent [19]
Townsend

[11] Patent Number: 5,806,917
[45] Date of Patent: Sep. 15, 1998

[54] INTEGRATED MOTOR VEHICLE DOOR AND CHASSIS

[75] Inventor: John A. Townsend, Bloomfield Hills, Mich.

[73] Assignee: Joalto Design, Inc., Southfield, Mich.

[21] Appl. No.: 577,649

[22] Filed: Dec. 22, 1995

[51] Int. Cl.$^6$ .................................................. B60R 27/00
[52] U.S. Cl. ........................... 296/202; 296/56; 296/155; 296/146; 296/146.5; 296/146.6; 296/146.9; 296/146.11
[58] Field of Search ................. 296/202, 146.1, 296/155, 146.5, 146.6, 146.9, 146.11, 56; 49/502

[56] References Cited

U.S. PATENT DOCUMENTS

| | | | |
|---|---|---|---|
| 780,331 | 1/1905 | Fletcher | 49/425 |
| 1,096,402 | 5/1914 | Strauss | 49/420 |
| 1,185,783 | 6/1916 | Edwards | 49/420 |
| 1,287,606 | 12/1918 | Allmand | 49/420 |
| 1,713,165 | 5/1929 | Bridge | 49/425 |
| 1,940,444 | 12/1933 | Burgman | 49/40 |
| 1,972,556 | 9/1934 | Goldberg | 189/72 |
| 2,036,118 | 3/1936 | Carr | 296/68 |
| 2,100,561 | 11/1937 | Kliesrath | 280/106 |
| 2,160,099 | 5/1939 | Zeligman et al. | 49/40 |
| 2,622,919 | 12/1952 | Scott | 296/44 |
| 2,650,387 | 9/1953 | Foss | 49/420 |
| 2,651,541 | 9/1953 | Surles | 296/44 |
| 2,785,921 | 3/1957 | Barenyi | 296/28 |
| 2,819,114 | 1/1958 | Lake | 296/44 |
| 3,191,993 | 6/1965 | Parks | 297/388 |
| 3,322,463 | 5/1967 | Neale et al. | 297/417 |
| 3,397,487 | 8/1968 | Hunt et al. | 49/420 |
| 3,567,209 | 3/1971 | Lathers | 296/50 |
| 3,594,036 | 7/1971 | Cadiou | 296/155 |
| 3,623,768 | 11/1971 | Capener | 297/390 |
| 3,645,043 | 2/1972 | Velavicius et al. | 49/370 |

(List continued on next page.)

FOREIGN PATENT DOCUMENTS

| | | | |
|---|---|---|---|
| 493225 A | 7/1992 | European Pat. Off. | 296/146.11 |
| 961405 | 5/1950 | France | 296/155 |
| 1026247 | 4/1952 | France | 296/155 |
| 1013189 | 7/1952 | France | 296/155 |
| 73938 | 10/1960 | France | 296/216 |
| 2478718 | 3/1981 | France | 296/155 |
| 895409 | 11/1953 | Germany | 296/155 |
| 1220266 | 6/1966 | Germany | 296/65.1 |
| 1806716 | 11/1968 | Germany | 296/28 R |
| 2038050 | 2/1972 | Germany | 296/153 |
| 2364632 | 12/1973 | Germany . | |
| 3344707 | 6/1985 | Germany | 297/411.32 |
| 3435678 | 6/1986 | Germany | 297/481 |
| 3701419 | 7/1988 | Germany | 297/378.11 |
| 4240416 | 12/1992 | Germany . | |
| 613307 | 12/1960 | Italy | 296/155 |
| 3-281455 (A) | 12/1991 | Japan | B60R 21/16 |
| 4-50052 (A) | 2/1992 | Japan | B60R 21/06 |
| 4-356246 (A) | 9/1992 | Japan | B60R 21/06 |
| 225087 | 4/1943 | Switzerland | 296/155 |
| 242592 | 6/1926 | United Kingdom | 296/207 |
| 1085891 | 10/1967 | United Kingdom | 296/155 |
| 1592155 | 7/1981 | United Kingdom | 296/155 |

*Primary Examiner*—Gary C. Hoge
*Attorney, Agent, or Firm*—Limbach & Limbach L.L.P.

[57] ABSTRACT

A motor vehicle chassis is disclosed wherein a conventionally hinged door is integrated with and becomes a structural part of the main chassis when the door is closed. Wedge-shaped structural keys located on the forward and rearward edges of the door engage mating receptacles on the door jamb to transmit compressive, tensile, and torsional forces across the door opening when the door is closed. Preferably, the door hinges are separated when the door is closed so that all forces are transmitted through the keys and receptacles without interference from the hinges. The inventive technology can also be used with other vehicle door panels such as sliding side van doors, hoods, trunks, liftgates and tailgates to form a stronger, stiffer vehicle chassis that is less susceptible to deformation during impact.

30 Claims, 13 Drawing Sheets

U.S. PATENT DOCUMENTS

| | | | |
|---|---|---|---|
| 3,699,716 | 10/1972 | Wanlass | 49/40 |
| 3,718,364 | 2/1973 | Fischer et al. | 296/28 R |
| 3,788,686 | 1/1974 | Rossie et al. | 296/146.6 |
| 3,807,799 | 4/1974 | Freedman | 297/417 |
| 3,819,228 | 6/1974 | Cornacchia | 296/146.9 |
| 3,887,227 | 6/1975 | Deckert | 296/28 R |
| 3,888,540 | 6/1975 | Protze et al. | 297/384 |
| 3,899,191 | 8/1975 | Royce | 280/150 |
| 3,967,851 | 7/1976 | Stier | 297/416 |
| 4,090,734 | 5/1978 | Inami et al. | 296/146 |
| 4,159,145 | 6/1979 | Quakenbush | 297/113 |
| 4,230,414 | 10/1980 | Cheshire | 403/95 |
| 4,323,278 | 4/1982 | Sukopp et al. | 297/481 |
| 4,372,580 | 2/1983 | Motonami et al. | 208/802 |
| 4,415,195 | 11/1983 | Furukawa et al. | 296/146 |
| 4,600,217 | 7/1986 | Naumann et al. | 280/808 |
| 4,642,941 | 2/1987 | Staran et al. | 49/352 |
| 4,668,010 | 5/1987 | Fujiwara | 297/150 |
| 4,793,099 | 12/1988 | Friese et al. | 49/380 |
| 4,801,172 | 1/1989 | Townsend | 296/155 |
| 4,881,778 | 11/1989 | Stephenson et al. | 297/417 |
| 4,940,282 | 7/1990 | Townsend | 296/204 |
| 5,072,966 | 12/1991 | Nishitake et al. | 280/730 |
| 5,074,611 | 12/1991 | Newkirk | 296/416 |
| 5,106,160 | 4/1992 | Nomura et al. | 297/417 |
| 5,112,079 | 5/1992 | Haland et al. | 280/730 |
| 5,172,790 | 12/1992 | Ishikawa et al. | 180/268 |
| 5,224,733 | 7/1993 | Simsic | 280/730 |
| 5,224,752 | 7/1993 | Marshall | 296/146 |
| 5,251,931 | 10/1993 | Semchena et al. | 280/730 |
| 5,277,441 | 1/1994 | Sinnhuber | 280/730 R |
| 5,290,084 | 3/1994 | Sinnhuber | 296/68.1 |
| 5,306,067 | 4/1994 | Hull et al. | 296/146.6 |
| 5,316,336 | 5/1994 | Taguchi et al. | 280/730 A |
| 5,348,342 | 9/1994 | Haland et al. | 280/730 A |
| 5,364,157 | 11/1994 | Siedlecki | 296/146.6 |
| 5,378,036 | 1/1995 | Townsend | 276/155 |
| 5,605,371 | 2/1997 | Borchelt et al. | 296/188 |

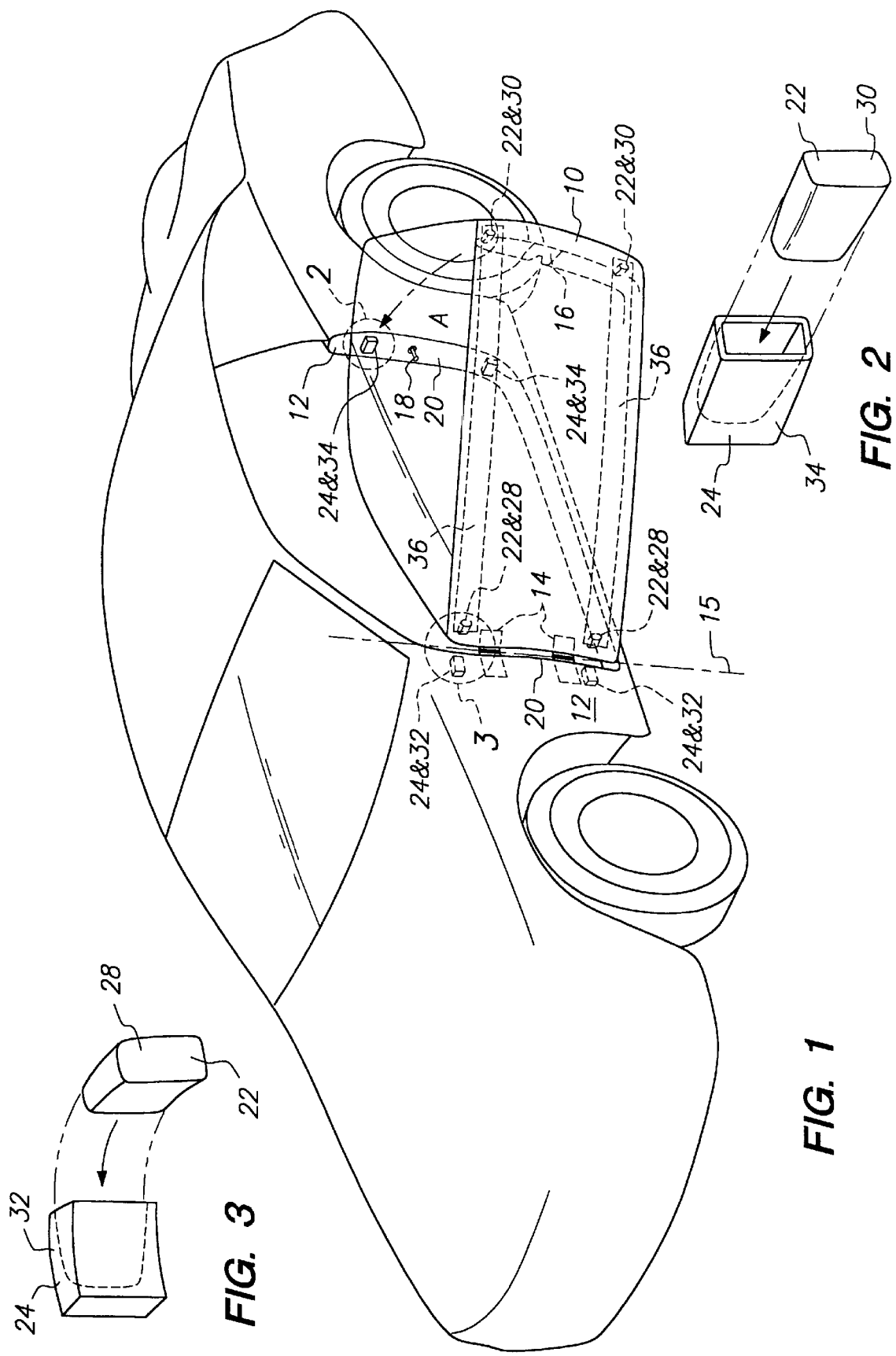

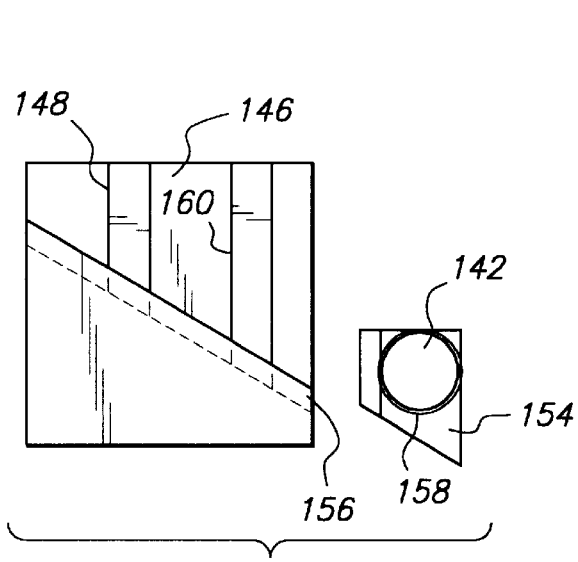
FIG. 9
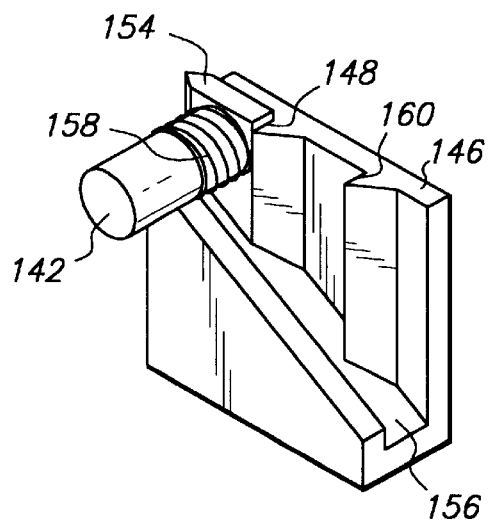
FIG. 10
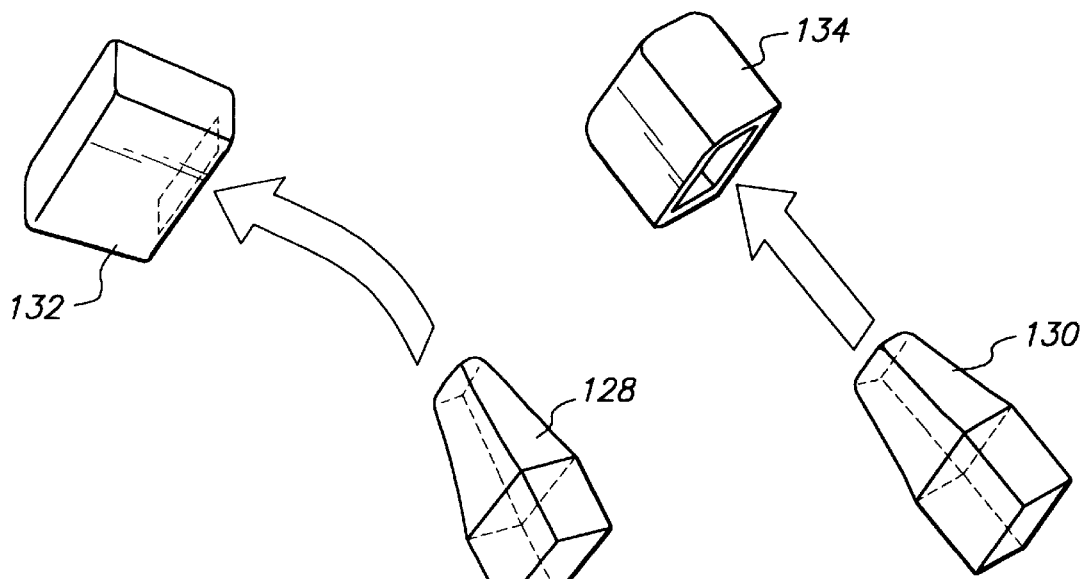
FIG. 11            FIG. 12

INTEGRATED MOTOR VEHICLE DOOR AND CHASSIS

BACKGROUND OF THE INVENTION

1. Field of the Invention

The present invention relates to motor vehicle chassis, and in particular to structurally integrating conventional motor vehicle doors with the chassis.

2. Discussion of the Prior Art

It has been previously proposed to structurally integrate a vertically sliding door into a vehicle chassis. This Door And Chassis Integration Technology (DACIT) as applied to vertically sliding doors is disclosed in the following U.S. Patents issued to John A. Townsend, incorporated herein by reference: U.S. Pat. No. 4,801,172 issued Jan. 31, 1989; U.S. Pat. No. 4,940,282 issued Jul. 10, 1990; U.S. Pat. No. 5,378,036 issued Jan. 3, 1995; and application Ser. No. 08/328,124 filed Oct. 20, 1994.

In operation, when the vertically sliding door which is the subject of the above patents is closed, structural key members located on the edges of the door engage with mating receptacles in the door jamb. In this position, each key member and mating receptacle pair is able to transmit compressive, tensile and torsional forces between the door and the vehicle chassis. The gap in the vehicle chassis structure that is created by the door opening is bridged by the door when it is in the closed position. This integrated chassis system that exists when the doors of the vehicle are closed provides a much stiffer vehicle frame and more fully surrounds the vehicle occupants to protect them from front, rear and side impact.

DACIT technology using structural keys and mating receptacles has not heretofore been applied to conventional hinged vehicle doors. However, attempts have been made in the past to structurally tie conventional vehicle doors to the chassis when closed. For example, U.S. Pat. No. 5,224,752 issued to Marshall on Jul. 6, 1993, discloses a hinged vehicle door having a tie bar capable of transmitting loads between door posts on opposite sides of the door opening. However, this apparatus is complex and requires many moving parts in addition to the tie bar, such as a solenoid, bearings, keeper plates, and a spring.

Another example is shown in U.S. Pat. No. 3,887,227 issued to Deckert on Jul. 3, 1975. This apparatus employs tension members within a vehicle door that are tied to opposite sides of the door opening when the door is closed. However, these tension members do not provide support to the vehicle's chassis structure until a collision occurs, and even then the members only transmit tensile forces. The tension members of this apparatus do not provide support to the chassis structure during normal driving. Furthermore, these tension members are not capable of transmitting compressive or torsional forces across the door openings, which would be needed to reduce structural deformation during a front or rear end collision.

None of the previously proposed configurations offer the simplicity and structural rigidity of the present invention in integrating a vehicle door structure with a chassis structure.

SUMMARY OF THE INVENTION

The present invention integrates conventional door panels such as a hinged door with the vehicle chassis by employing structural keys that engage mating receptacles when the door is closed to transmit tensile, compressive and torsional forces between the door and the chassis.

In accordance with one aspect of the present invention, wedge shaped structural keys are located at the top and bottom of both the forward and rearward edges of a conventional hinged door, facing inward. Mating receptacles are positioned in the front and rear door jambs facing outward towards the keys. When the door is closed, the keys engage the mating receptacles and form a tight fit therewith. The mating receptacles are structurally connected to the vehicle chassis, and the keys are structurally interconnected through the door framework, which includes members which span across the door between the keys. Therefore, when the door is in a closed position, tensile, compressive and torsional forces can be transmitted across the door opening through the mating keys and receptacles and through the door structure.

In accordance with another aspect of the present invention, mating surfaces on the structural keys and receptacles are formed generally concentric with a pivot axis through the door hinges to match the arcuate path followed by the keys when the door is opened and closed.

In accordance with yet another aspect of the present invention, the two halves of each hinge are isolated from one another when the door is closed so that no loads are transmitted across the hinges when the door is in a fully closed position. This is desirable so that there is no binding between the hinges and the structural members upon closing the door, and so that a straight load path through the door and chassis is created when the door is closed. If the hinges as well as the structural keys and receptacles are allowed to transmit forces through the door, undesirable bending moments are created which weaken the structural integrity of the door and chassis structure.

In the preferred embodiment, stepped hinge pins are provided to connect the two halves of each hinge. Each pin has a large diameter portion and a small diameter portion. When the door is open, the large diameter portion of the hinge pins is utilized and the weight of the door is carried by the hinges. As the door reaches the closed position, it is raised so that the small diameter portion of the hinge pins is utilized. When the door is fully closed, the half of the hinge that carries the hinge pin no longer contacts the other half of the hinge, and the door is held in place only by the structural keys, mating receptacles and a door catch at each end of the door. In this position, forces are transmitted between the door and chassis mainly by the structural keys and receptacles, and no forces are transmitted by the door hinges.

To raise the door upon closing to effect the isolation of the hinges, the front and rear edges of the door are each provided with latch posts. A ramped strike plate is associated with each latch post and is located on the door jamb. When the door approaches the closed position, the latch posts on the door engage with the ramped strike plates on the door jamb to lift the door. When the door is fully closed, the latch posts lock into detents on the ramped strike plates to retain the structural keys within their mating receptacles. To open the door, the latch posts are withdrawn from the detents and slide down ramped strike plates. This motion lowers the door onto the large diameter portion of the hinge pins, and the door is then supported by the hinges to be further opened in a conventional manner.

In accordance with still another aspect of the present invention, structural keys and mating receptacles are provided in an inward and upwardly inclined orientation to resist separation during a collision. The more the keys and receptacles are upwardly inclined, the more outward force they carry and the less outward force that the door catches have to carry to keep the door closed.

In the preferred embodiment, the door is raised as it approaches the fully closed position, as previously described. The rate at which the door is raised is coordinated with the inwardly pivoting travel of the door so that the structural keys located on the door are traveling in a direction that matches the orientation of the mating receptacles when the keys engage the receptacles. In other words, the angle of the ramped strike plate matches the angle of the structural keys and mating receptacles so that the keys and receptacles mate tightly in a smooth fashion.

When the vehicle doors are integrated into the chassis according to the present invention, vehicle occupants are afforded much greater protection. During a front or rear end collision or a rollover, the doors of the present invention carry compressive loads, keeping the upper portion of the vehicle body from collapsing on the occupants. During a side impact, the door on the same side as the impact goes into tension and is anchored to the vehicle chassis, thereby inhibiting intrusion into the vehicle. The door on the opposite side of the vehicle also goes into tension and inhibits the chassis from wrapping around the colliding vehicle, further preventing intrusion into the vehicle. In all types of collisions and rollovers, the doors of the present invention are structurally anchored to the chassis to prevent them from popping open and exposing or ejecting the occupants.

Other types of door panels, such as hoods, trunks, van sliding side doors, liftgates and tailgates, may also be integrated with the vehicle chassis using this technology. This allows essentially the entire vehicle body to be used to form a three dimensional chassis frame to better resist torsional forces and to enclose the vehicle occupants, as opposed to a chassisframe having serious gaps caused by the large total area of the door and other openings on the vehicle designs today or a typical flat chassis frame having its main structural members residing almost entirely below the occupants. By structurally bridging all or most of the door openings, a stiffer vehicle chassis can be created. Because this type of structure is more efficient, vehicle weight is also reduced.

Vans have recently been designed with sliding doors located on both sides of the vehicle. This type of design is not more widespread because when these large doors are placed on both sides of the vehicle, the remaining body/chassis that is left does not have a great deal of strength and rigidity. By employing the present invention on dual van doors, a much stronger, stiffer, safer and lighter weight van of this type can be more easily designed.

There has been recent controversy over the lack of safety of certain rear liftgate door latches on mini-vans, as they tend to pop open during collisions. Again, by employing the technology of the present invention to a liftgate, these problems not only are eliminated, but the structural integrity of the entire rear portion of the vehicle is vastly improved.

Another advantage to structurally integrating doors with a vehicle chassis is allowing vehicle manufacturers to stiffen the chassis on a convertible and allow the use of the same chassis for both sedan and convertible models of the same vehicle. Typically, the chassis of a convertible must be reinforced to compensate for the loss of rigidity that the sedan roof provides. This can take up passenger room and still produce a convertible that is not as torsionally stiff as its sedan counterpart. This affects driving performance as well as safety during a collision. By integrating the doors with the chassis using the present invention, one chassis instead of two can be produced on an assembly line, and both the sedan and the convertible can be made more rigid than before using less weight.

BRIEF DESCRIPTION OF THE DRAWINGS

FIG. 1 is a perspective view showing a first embodiment of the present invention as applied to a conventional hinged vehicle door.

FIG. 2 is an enlarged partial view taken within line 2 of FIG. 1 showing a rear structural key and mating receptacle.

FIG. 3 is an enlarged partial view taken within line 3 of FIG. 1 showing a front structural key and mating receptacle.

FIG. 9 is a side elevational view of a striker post and plate utilized in the second and third embodiments, shown in an open position.

FIG. 10 is a perspective view of a striker post and plate utilized in the second and third embodiments, shown in the closed position.

FIG. 11 is a perspective view of a front key and receptacle of the second embodiment shown in an open position.

FIG. 12 is a perspective view of a rear key and receptacle of the second embodiment shown in an open position.

DETAILED DESCRIPTION OF THE PREFERRED EMBODIMENTS

Figure 4:
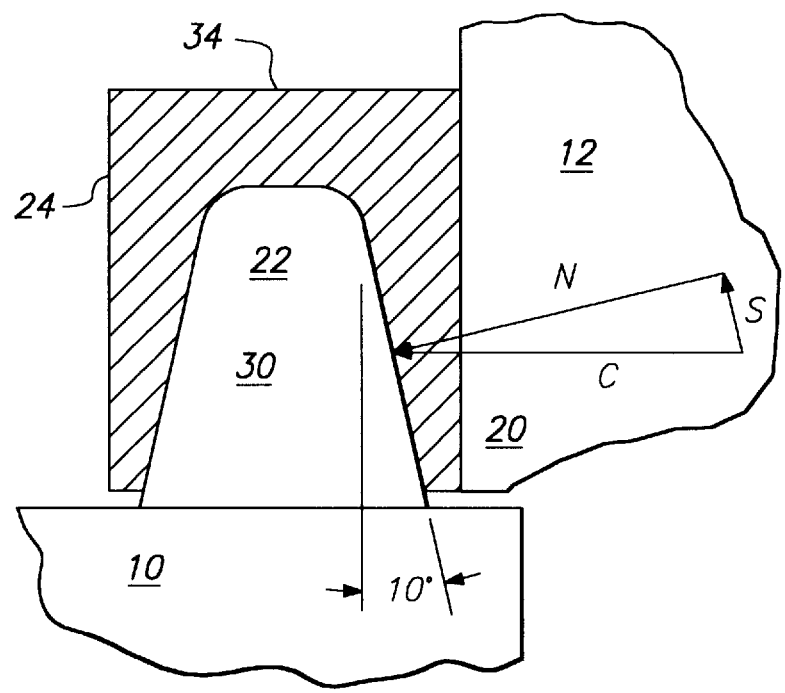
FIG. 4 is a fragmentary plan view schematically showing forces applied to a rear structural key in the first embodiment.

Referring to FIG. 1, a first embodiment of the present invention is shown applied to a conventionally hinged door 10. Door 10 is pivotably connected to the vehicle body 12 by upper and lower hinges 14, and pivots about axis 15 which passes through upper and lower hinges 14. Door 10 is shown in an open position and pivots about hinge axis 15 in the direction of Arrow A to a closed position. Door 10 is releasably held in the closed position by a conventional door catch 16 mounted on the rearward edge of door 12 which engages a post 18 mounted on the rear of door jamb 20.

The front portion of door 10 is provided with at least one front structural key 28 projecting toward the interior of vehicle body 12. Similarly, the rear portion of door 10 is also provided with at least one rear structural key 30. Preferably, a front structural key 28 is located near both the top and bottom of the leading edge of door 10, and a rear structural key 30 is located near both the top and bottom of the trailing edge of door 10, as shown. Associated with each front structural key 28 is a mating front receptacle 32 located on the front portion of door jamb 20 adjacent to each front key 28. Likewise, associated with each rear structural key 30 is a mating rear receptacle 34 located on the rear portion of door jamb 20 adjacent to each rear key 30. Receptacles 32 and 34 are positioned such that they receive keys 28 and 30, respectively, and form a tight fit therewith, when door 10 is closed.

Door 10 is preferably provided with an interior structural framework which includes cross beams 36 spanning between front keys 28 and rear keys 30. Front and rear receptacles 32 and 34 are rigidly integrated into the structural chassis of vehicle body 12. Therefore, when door 10 is closed and structural keys 28 and 30 engage mating receptacles 32 and 34, the gap created in the structural chassis of vehicle body 12 by the door opening is bridged by cross beams 36. Structural keys 28 and 30, mating receptacles 32 and 34, and cross beams 36 cooperate to transmit compressive, tensile and torsional forces across the door opening. This arrangement provides for a much stiffer and stronger vehicle chassis when door 10 is closed. To further increase impact strength, additional keys and mating receptacles may be located on the sides and/or bottom edges of door 10. If the door is constructed with a rigid channel around the window when extended, similar disengageable structural connections can be formed between this part of the door and the vehicle roof and or the A and B pillars to the front and rear of the door, respectively.

Referring to FIG. 2, each rear key 30 has tapered faces to allow for a proper alignment and a tight fit within mating rear receptacle 34. The oblong base of the key preferably is about 1 inch wide and 2 inches tall. Preferably, each face is has a 10 degree taper (i.e. opposing faces have an included angle of 20 degrees.) This angle is small enough to provide enough mechanical advantage for a tight fit between rear key 30 and rear receptacle 34 when door 10 is closed, but not so small that key 30 and receptacle 34 are wedged together and difficult to separate when opening door 10.

Referring to FIG. 3, front keys 28 and mating front receptacles 32 have similar tapered configurations to rear keys 30 and mating rear receptacles 34. However, since front keys 28 are located in close proximity to hinges 14, they should be curved to match the curved path they travel when door 10 pivots on hinges 14 about axis 15. In other words, the mating surfaces of front keys 28 and receptacles 32 are generally concentric with hinge axis 15. As rear keys 30 and receptacles 34 are much farther away from hinges 14 and travel a straighter path, it may be possible to eliminate the slightly curved mating surfaces and instead use straight surfaces to reduce the manufacturing costs of rear keys 30 and rear receptacles 34.

Referring to FIG. 4, a typical force that can be transmitted across door 10 through rear keys 30 will be discussed. Compressive force C is shown applied to rear key 30 by rear receptacle 34. Compressive force C can be broken down into its components of normal force N and shear force S as shown. With a 10 degree tapered face on rear key 30 as shown, normal force N will equal C·cos 10°, or roughly 98% of compressive force C. Similarly, shear force S will equal C·sin 10°, or roughly 17% of compressive force C.

Figure 6:
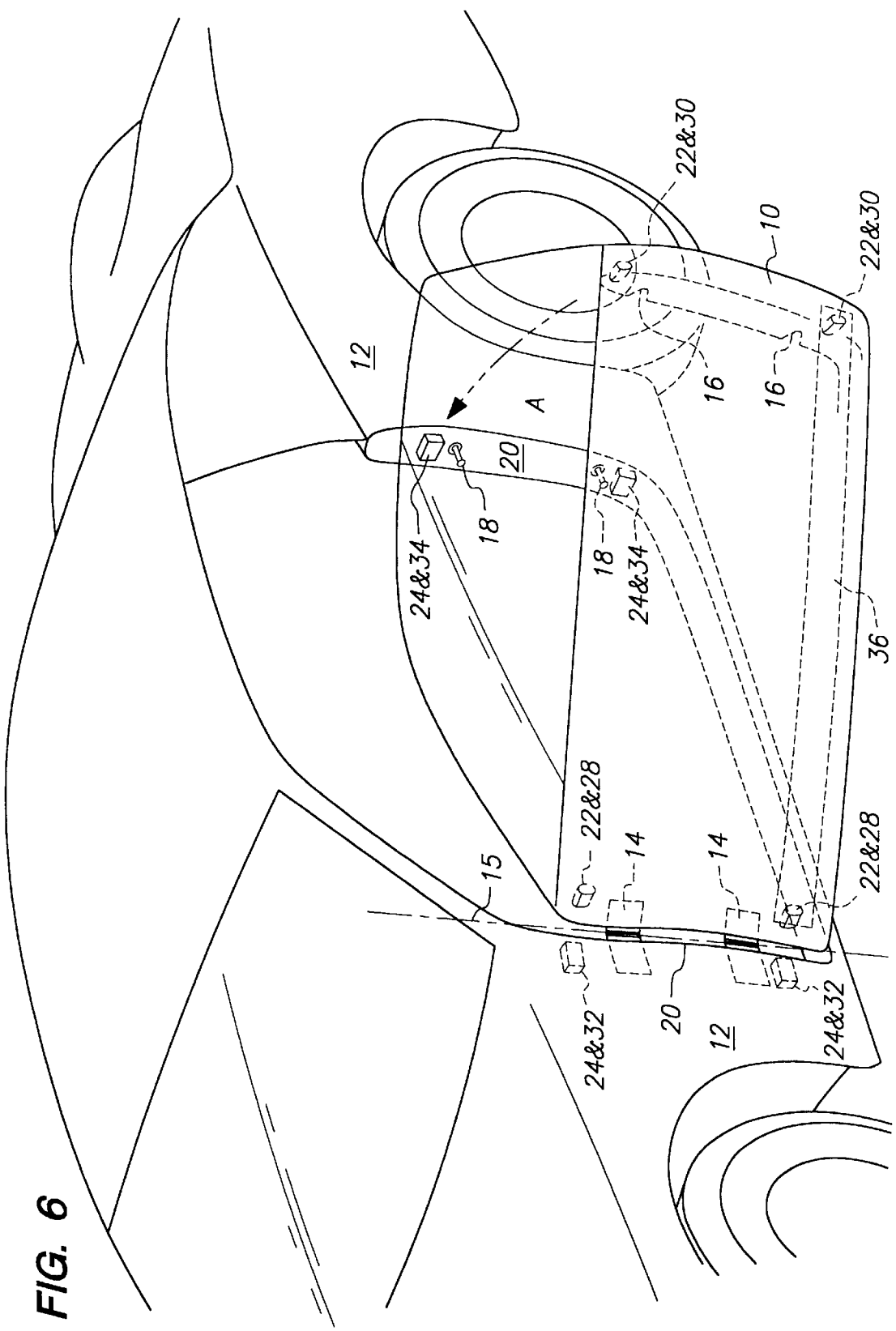
FIG. 6 is an enlarged perspective view showing an alternative embodiment having two door catches. (The upper cross beam 36 is removed here for clarity.)

By making structural keys 28 and 30 and mating receptacles 32 and 34 out of hardened steel, a high normal force N, such as from a front or rear collision, can be accommodated by the structure. Shear force S, on the other hand, will tend to separate structural keys 28 and 30 from mating receptacles 32 and 34. To keep rear keys 30 in tight contact with rear receptacles 34, catch 16 (shown in FIG. 1) should be designed to withstand at least 17% of the compressive forces transmitted through door 10. Alternatively, two catches can be used, one directly adjacent to each rear key 30 (as shown in FIG. 6). Rear keys 30, rear receptacles 34, and catch 16 behave in basically the same manner whether door 10 is put into tension or compression.

Figure 5:
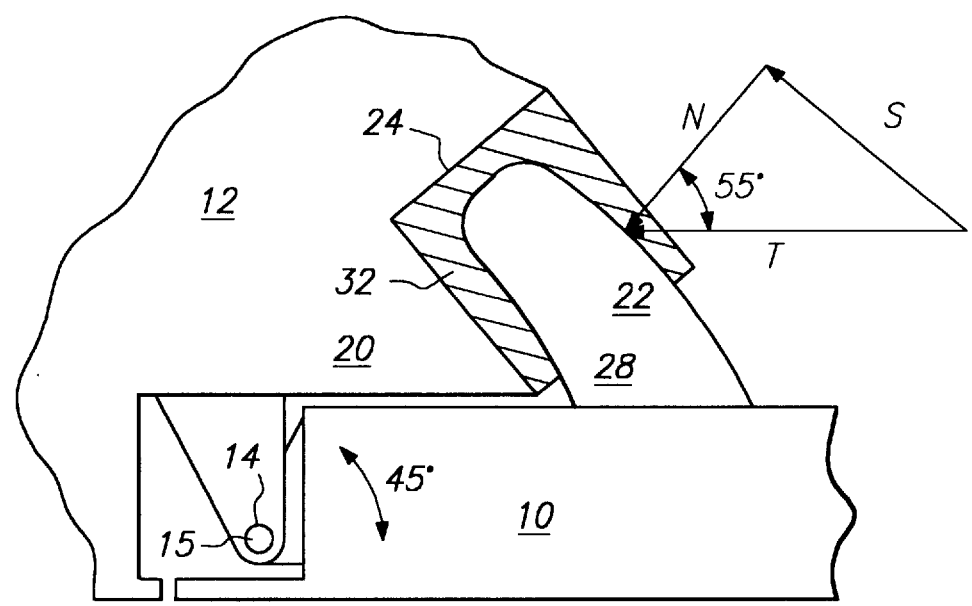
FIG. 5 is a fragmentary plan view schematically showing forces applied to a front structural key in the first embodiment.

Referring to FIG. 5, a similar analysis of forces affecting the front of door 10 will now be discussed. Because of the geometry of the front edge of a vehicle door 10 and the location of hinges 14, it may not be possible to locate front keys 28 as close to the outside of door 10 as are hinges 14. Similarly, front receptacles 32 may need to be located further inboard so as not to obstruct the open doorway. Because front keys 28 travel in a tight arc around hinges 14, in this instance front receptacles 32 must be oriented toward the front of the vehicle as shown to receive front keys 28, as opposed to being oriented directly inboard as are the rear receptacles 34 shown in FIG. 4. In this example, the center of front receptacle 32 is oriented at a 45 degree angle. It is apparent from FIG. 5 that this arrangement transmits compressive forces better than tensile forces. This results from compressive forces driving the front keys 28 farther into front receptacles 32, while tensile forces tend to separate the two members and require another component, such as hinges 14, to help maintain engagement.

In a fashion similar to the analysis of forces on rear key 30 above, the tensile force T exerted on front key 28 by front receptacle 32 can be broken down into its components of normal force N and shear force S as shown. With a 10 degree tapered face on front key 28, the middle of the rearward face of front key 28 is oriented at a 55 degree angle. In this situation, normal force N will equal T·cos 55°, or roughly 57% of tensile force T. Similarly, shear force S will equal T·sin 55°, or roughly 82% of tensile force T. Neglecting for now that front key 28 and front receptacle 32 are curved, this means that front key 28 will be urged out of engagement with front receptacle 32 with a force roughly equal to 82% of the tensile force T. Hinges 14 should be designed with sufficient strength to withstand this load, which will be especially high during a collision, to maintain engagement of front key 28 in front receptacle 32. The above force analysis points out the desirability of keeping front receptacle 32 oriented as directly inboard as possible.

The tendency described above for front key 28 to separate from front receptacle 32 is alleviated somewhat by the curvature of the two members. In other words, because the base of front key 28 is more correctly oriented than the rest of front key 28, it will take more of the load (and therefore put less load on hinges 14.) However, this aspect gives front key 28 less load transmitting area, and therefore front key 28 may need to be designed larger than rear key 30 in order for it to be able to transmit the same load.

Referring to FIGS. 7–17, a second embodiment of the present invention is shown. This second embodiment is similar to the first, but in order to eliminate the drawbacks discussed above, the door in this embodiment is raised as it approaches the closed position to physically isolate the hinges and to allow the keys and receptacles to be upwardly inclined so that they are able to resist outward forces.

Figure 7:
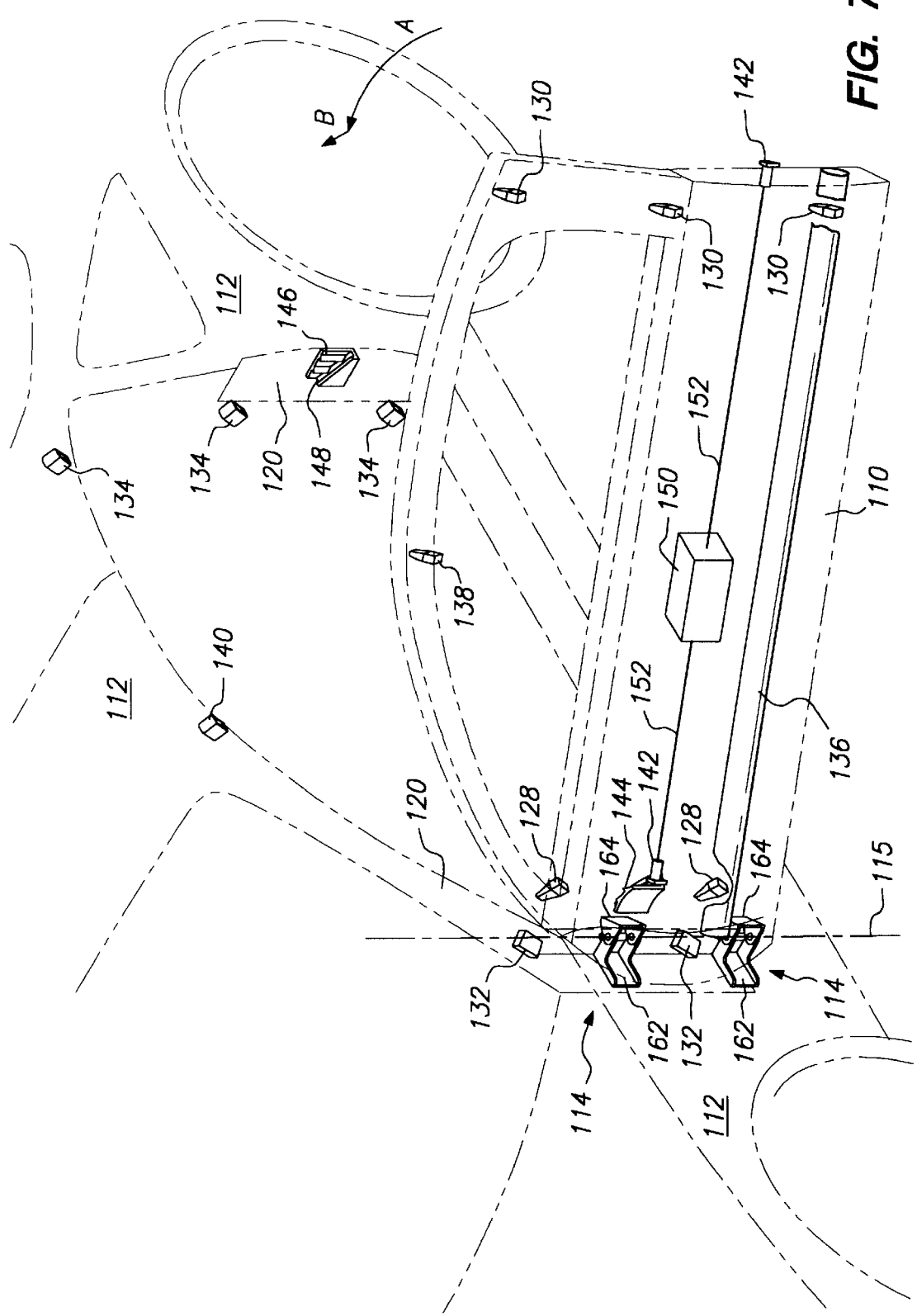
FIG. 7 is a perspective view showing a second embodiment of the present invention applied to a conventional hinged vehicle door shown in the open position.
Figure 8:
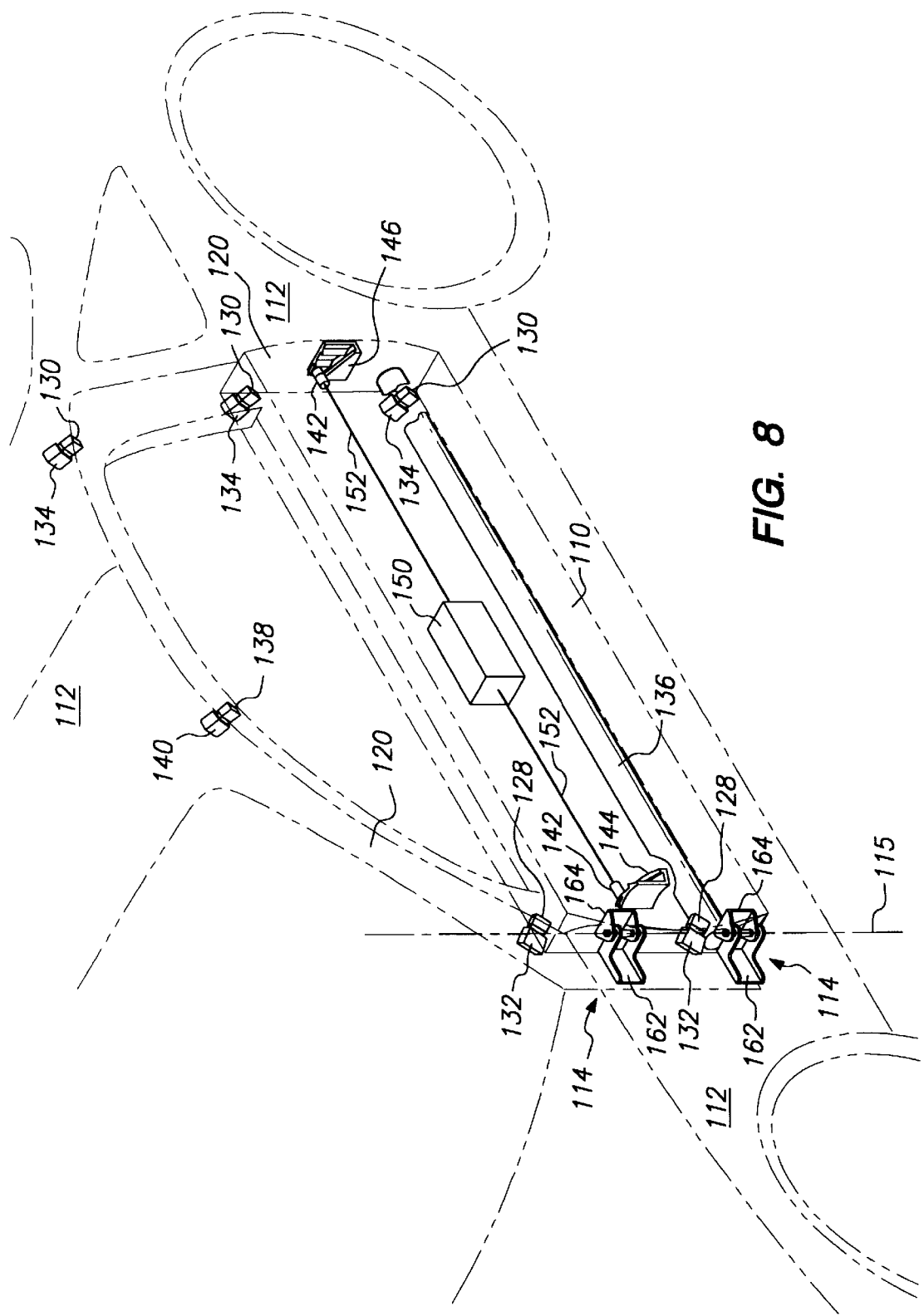
FIG. 8 is a perspective view of the second embodiment with the door shown in the closed position.

Referring to FIGS. 7 and 8, door 110 is provided with front keys 128 and rear keys 130 which mate with front receptacles 132 and rear receptacles 134, respectively, as previously described. In addition, a fifth mating set of structural members is provided comprising a rear key 130 and rear receptacle 134, as well as a sixth set comprising intermediate key 138 and intermediate receptacle 140, all located on the upper door frame and upper door jamb. Keys 128, 130 and 138 and receptacles 132, 134 and 140 are oriented at an upward angle from horizontal to match the inward and upward travel of door 110 as the door reaches the closed position. Preferably, this angle is 30 degrees above horizontal. By orienting keys 128, 130 and 138 and receptacles 132, 134 and 140 at an upward angle, a horizontal component of force can be exerted on keys 128, 130 and 138 by receptacles 132, 134 and 140 to help the door latches secure door 110 in the closed position.

To raise door 110 when it approaches the closed position, both the front and rear ends of door 110 are provided with spring loaded striker posts 142 that engage front and rear ramped strike plates 144 and 146, respectively, which are mounted on the door jamb 120. Preferably, both ends of door 110 are raised ⅜" during the last ⅝" of door travel to allow keys 128, 130 and 138 to smoothly engage receptacles 132, 134 and 140, respectively. Arrow A shows the horizontal direction door 110 pivots in when being closed, and arrow B shows the inclined direction door 110 travels in when approaching the fully closed position. When door 110 reaches the fully closed position, striker posts 142 drop into detents 148 in striker plates 144 and 146 to hold the door in the closed position.

To open door 110, a conventional door release mechanism 150 pulls cables 152 attached to striker posts 142 to retract striker posts 142 from detents 148. Striker posts 142 are then free to slide down front and rear ramped striker plates 144 and 146, thereby lowering door 110, releasing keys 128, 130 and 138 from receptacles 132, 134 and 140, and allowing door 110 to be swung open.

Referring to FIGS. 9 and 10, the preferred design of striker post 142 and rear striker plate 146 is shown. Striker post 142 is provided with an angled flange 154 on its distal end which contacts ramp 156 on striker plate 146 to raise the door. Compression spring 158 outwardly biases angled flange 154 against strike plate 146. Like a conventional vehicle door latch, this latching mechanism has two latching positions. When the door is fully closed, spring 158 urges angled flange 154 into detent 148, as shown. Detent 160 provides a secondary, safety latching position to keep the door from opening even though it is not in the fully closed position. Preferably, the leading edge of angled flange 154 and the leading edges of detents 148 and 160 are beveled for smooth operation.

It is preferable to have the structural keys engage with the mating receptacles in such a manner as to cause striker post 42 to lift slightly off of ramp 56 when the door is fully closed to prevent binding. In alternative embodiments (not shown), ramp 56 could be provided separately from the latching mechanism components or eliminated altogether, with the door being lifted solely by the structural keys engaging with the mating receptacles. In these embodiments, manufacturing costs could then be reduced by employing conventional latches.

Front strike plate 144 (shown in FIGS. 7 and 8) is a mirror image of rear strike plate 146, but is preferably curved concentric with the pivot axis of the door.

Figure 13:
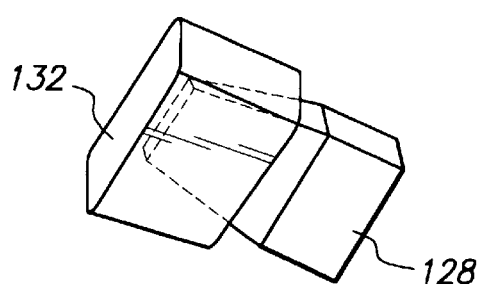
FIG. 13 is a perspective view of a front key and receptacle of the second embodiment shown in the closed position.

Referring to FIGS. 11 and 13, the upward and forward orientation of front key 128 and front receptacle 132 is shown.

Figure 14:
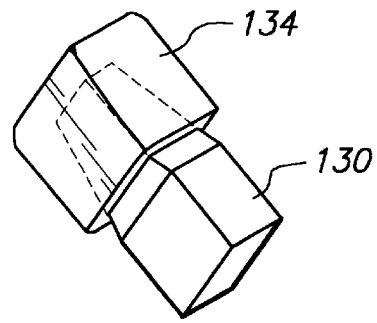
FIG. 14 is a perspective view of a rear key and receptacle of the second embodiment shown in the closed position.

Referring to FIGS. 12 and 14, the upward orientation of rear key 130 and rear receptacle 134 is shown.

Figure 15:
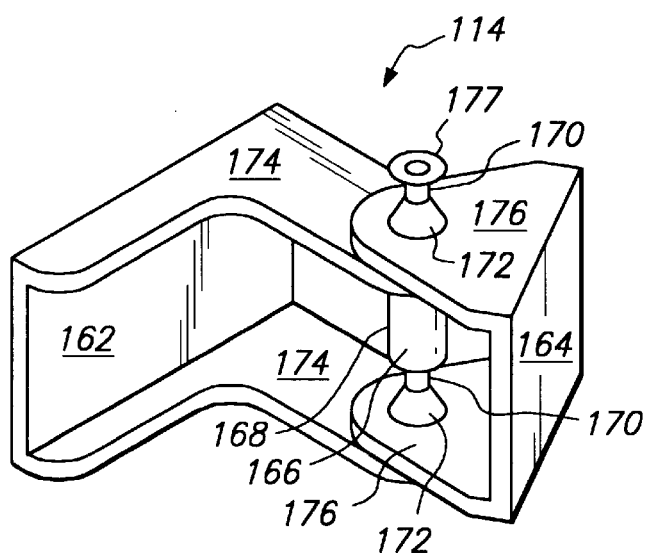
FIG. 15 is a perspective view of a hinge of the second embodiment shown in an open position.
Figure 16:
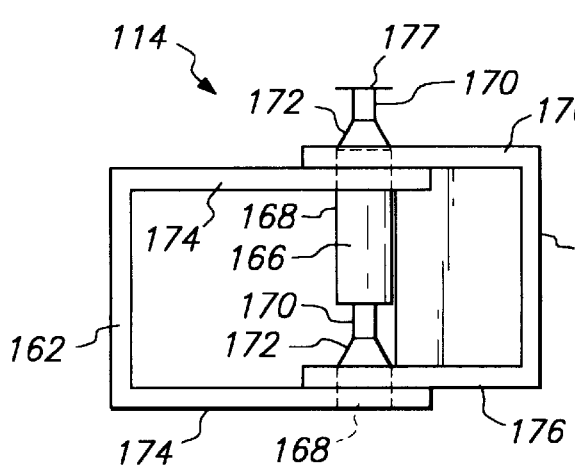
FIG. 16 is a side elevational view of a hinge of the second embodiment shown in an open position.
Figure 17:
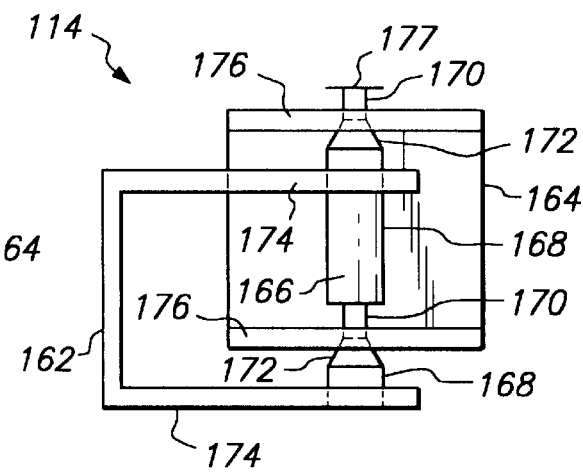
FIG. 17 is a side elevational view of a hinge of the second embodiment shown in the closed position.

Referring to FIGS. 15–17, the hinge isolation feature of the present invention will be described. Although only one door hinge 114 is shown, both the upper and lower hinges 114 are identical and operate in the same fashion. Each hinge 114 includes a body portion 162 attached to the vehicle body or chassis, a door portion 164 attached to the door, and a stepped hinge pin 166 carried by body portion 162 and interconnecting the two portions 162 and 164. Hinge pin 166 has two longitudinally spaced large diameter sections 168, two small diameter sections 170 above the large diameter sections 168, and two tapered transitional sections 172 between the large and small diameter sections 168 and 170. Both the body and door portions 162 and 164 are U-shaped and have two hinge flanges 174 and 176, respectively. Each of the four hinge flanges 174 and 176 carry a hole having the same nominal diameter as the large diameter sections 168 of hinge pin 166. The door portion flanges 176 rest on top of the body portion flanges 174, and hinge pin 166 passes through all four holes. Hinge pin 166 is rigidly attached to one or both body portion flanges 174, and the holes in the door portion flanges 176 are slightly enlarged to allow the door to pivot on the large diameter sections 168 of hinge pin 166.

Referring to FIGS. 15 and 16, hinge 114 is shown in the orientation occurring when the door is in a fully open position. In this position, the weight of the door is carried by the door portion flanges 176 rotatably resting on the body portion flanges 174, and the door is constrained to pivot about hinge axis 115. Limited vertical movement of the door is not constrained by hinge 114, as door portion flanges 176 may freely slide upward along hinge pin 166 and away from body portion flanges 174. Hinge cap 177 prevents the door from being lifted off of its hinges 114.

Referring to FIG. 17, hinge 114 is shown in the raised and isolated position it occupies when the door is fully closed. As described above, the door rises about ⅜" as it approaches the fully closed position. In this raised position, door portion flanges 176 no longer contact body portion flanges 174, and the holes through the door portion flanges 176 are aligned with the small diameter sections 170 of hinge pin 166. Therefore, in this position there is no contact between the body portion 62 and the door portion 64 of hinges 114, and the two portions are physically isolated from each other.

When the door is closed, it is no longer supported by hinges 114, but is instead supported by the structural keys within the mating receptacles and by the door catches. By eliminating the load path through the hinges by isolating them when the door is closed, undesirable bending and twisting forces are eliminated, leaving a simple and straight load path though the door by way of the structural keys and receptacles. Potential problems with binding between the hinges and the structural keys and receptacles are also eliminated.

When the door is opened, it is lowered as previously described. As door portion flanges 74 drop from the raised position (shown in FIG. 17) to the lowered position (shown in FIGS. 15 and 16), the holes therein encounter the transitional sections 72 on hinge pin 66. Transitional sections 72 are tapered to guide the holes in door portion flanges 74 down onto the large diameter sections 68 where the door is pivotally supported.

Referring to FIGS. 18–23, a third embodiment of the present invention is shown. This third embodiment is similar to the second embodiment, but applies the door integration technology of the present invention to a vertically swinging rear lift gate rather than to a horizontally swinging passenger door.

Figure 18:
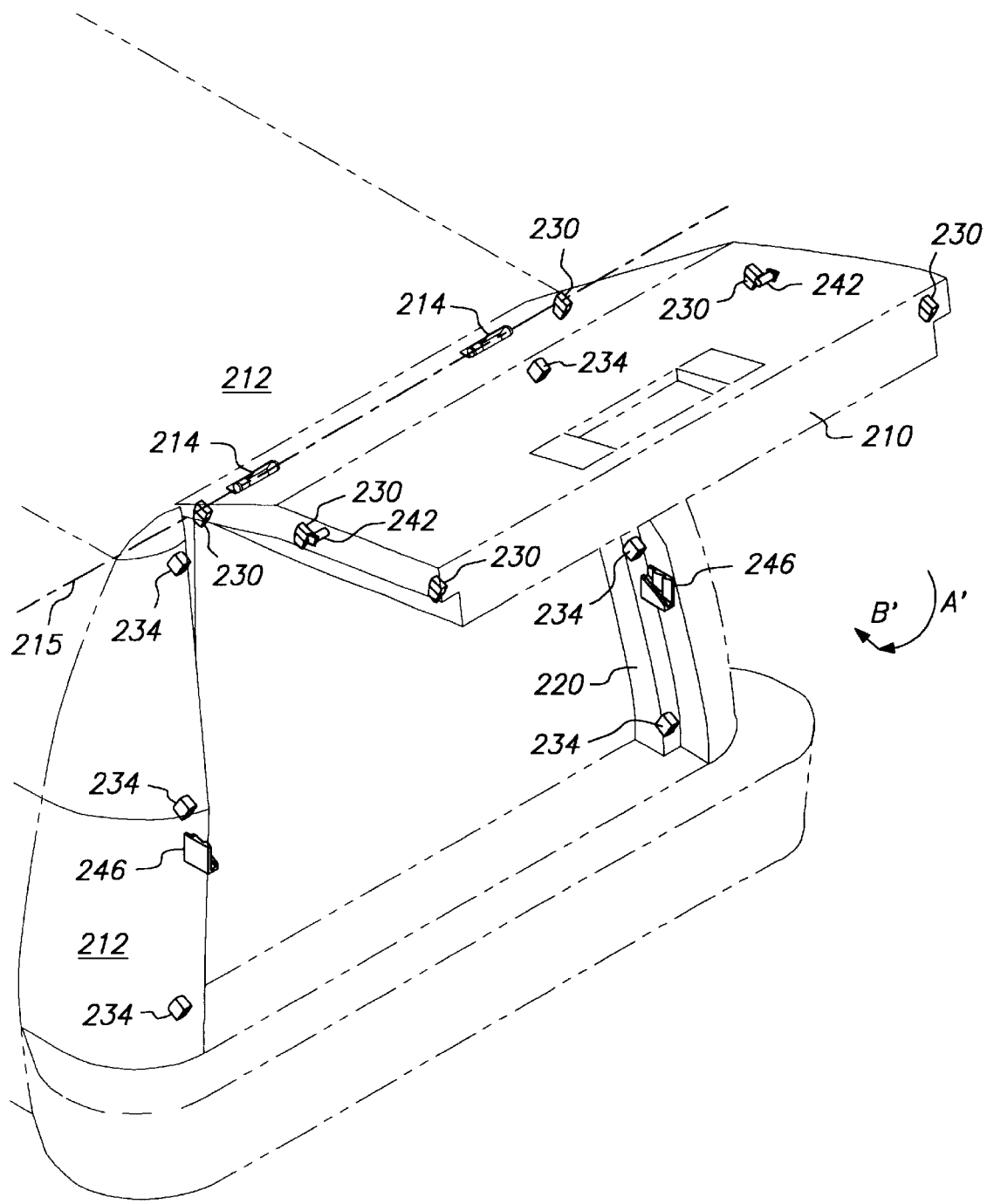
FIG. 18 is a perspective view showing a third embodiment of the present invention applied to a rear, liftgate-type door shown in the open position.
Figure 19:
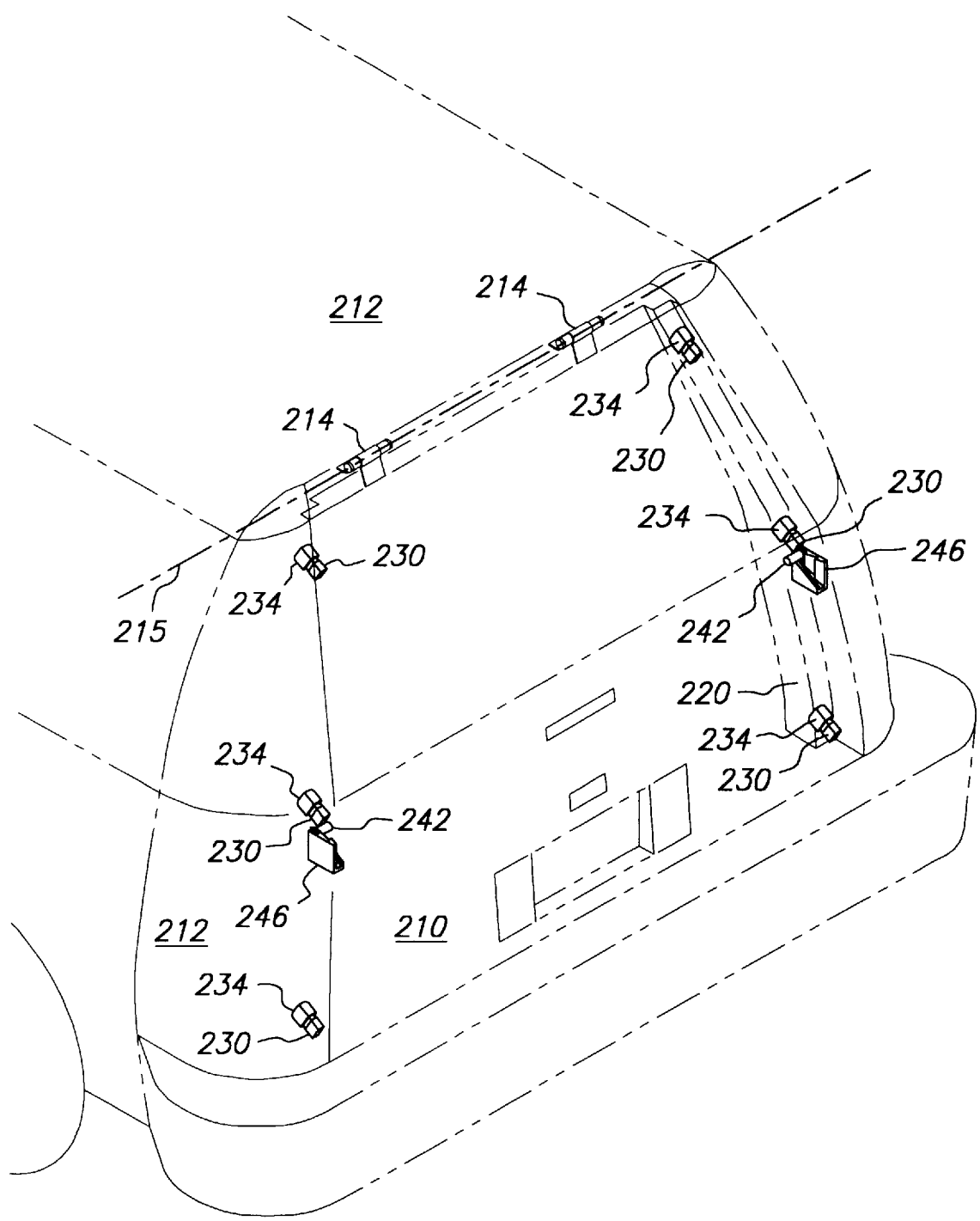
FIG. 19 is a perspective view of the third embodiment with the door shown in the closed position.
Figure 20:
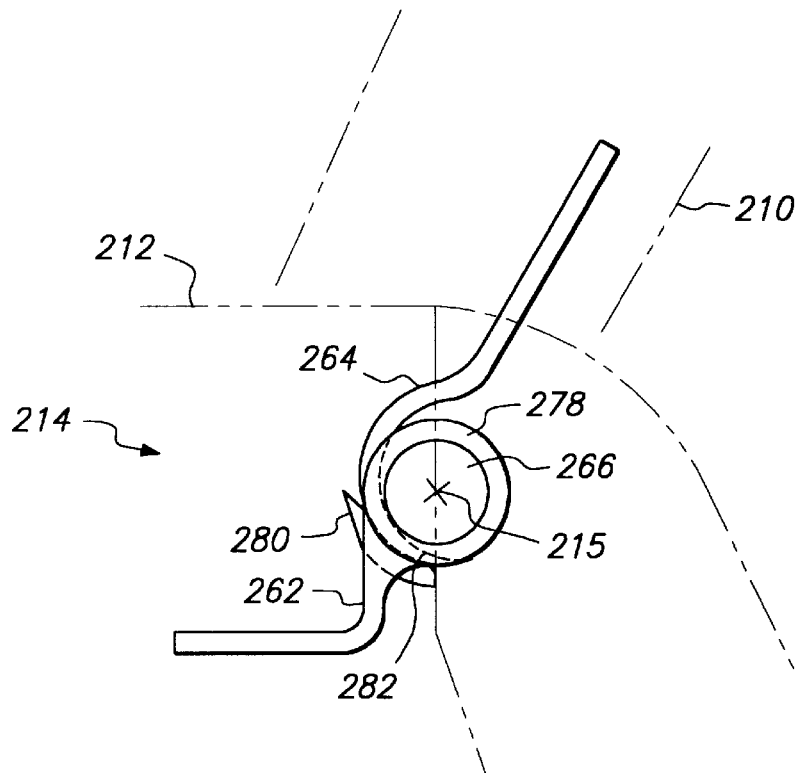
FIG. 20 is a side elevational view of a hinge of the third embodiment shown in an open position.
Figure 21:
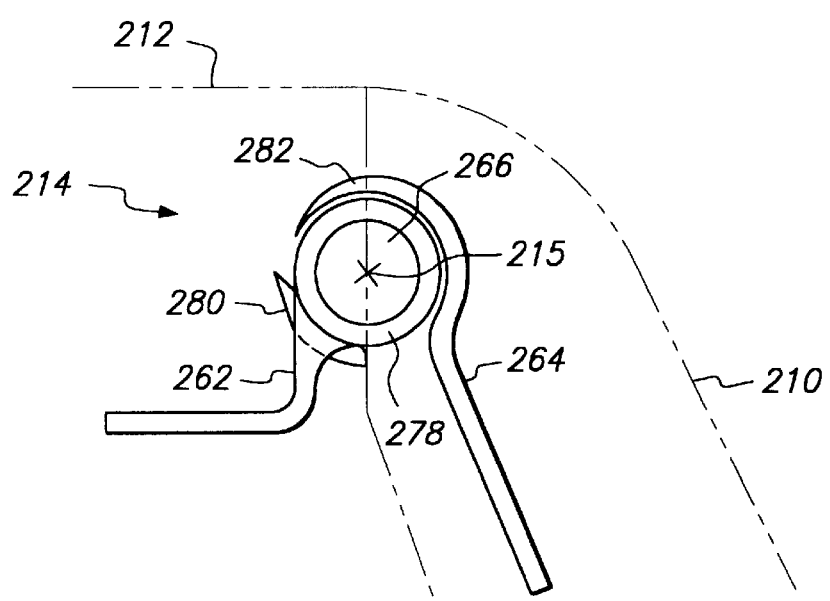
FIG. 21 is a side elevational view of a hinge of the third embodiment shown in the closed position.
Figure 22:
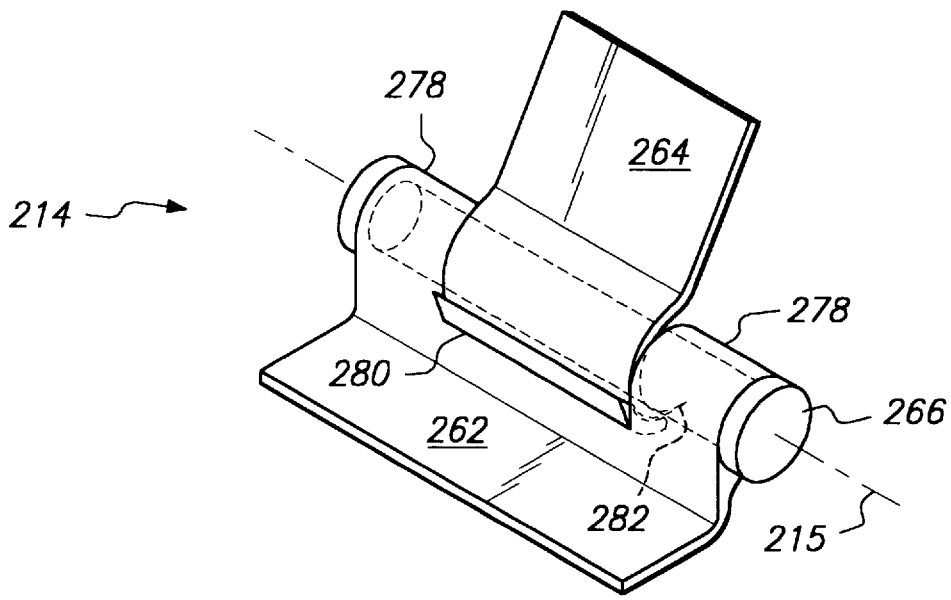
FIG. 22 is a perspective view of the rear side of a hinge of the third embodiment shown in an open position.
Figure 23:
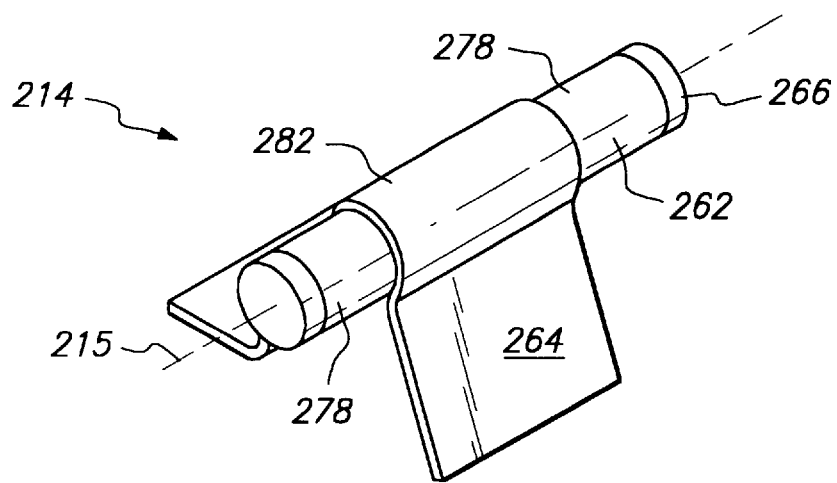
FIG. 23 is a perspective view of the front side of a hinge of the third embodiment shown in the closed position.

Referring to FIGS. 18 and 19, door 210 is pivotally mounted to the vehicle body 212 near the back of the vehicle roof by hinges 214 such that door 210 pivots around hinge axis 215 when opened and closed. Three structural keys 230 are located along each side of door 210, which structurally engage with mating receptacles 234 located on door jamb 220 when door 210 is closed. Again, the keys 230 and receptacles 234 are preferably angled upward 30 degrees.

As before, door 210 is raised as it reaches the closed position to allow keys 230 to enter receptacles 234 at the correct angle and to separate hinges 214. To accomplish this, striker posts 242 are provided on each side of door 210 to engage ramped strike plates 246 located on each side of door jamb 220. The vertically swinging door 210 of this embodiment is designed and functions in much the same way as door 110 in the second embodiment above, with the main difference being the construction and operation of hinges 214.

Referring to FIGS. 20–23, the construction of hinges 214 is shown. Only one hinge 214 is shown as both hinges are identical. Each hinge 214 includes a body portion 262 attached to the vehicle body, and a door portion 264 attached to door 210. Body portion 262 includes two longitudinally spaced journals 268 for rotatably supporting hinge pin 266 therebetween. Collar segment 280 is formed on the lower, back side of body portion 262 between journals 268 and is radially spaced apart from hinge pin 266.

When door 210 is in the open position (FIGS. 20 and 22), the tapered distal end 282 of door portion 264 is retained between hinge pin 266 and collar segment 280, and the body portion 262 and door portion 264 function together like a conventional hinge to pivotably retain door 210 on body 212. As door 210 is closed, distal end 282 rotates away from collar segment 280 but remains in contact with hinge pin 266. As door 210 approaches the fully closed position, door 210 is raised as previously described, and distal end 282 is thereby separated from hinge pin 266. When door 210 is fully closed (FIGS. 21 and 23), door 210 is no longer carried by hinges 214 but is held in place by the mating keys and receptacles and the door latches. In this position, body portion 262 is physically isolated from door portion 264, and forces cannot be transmitted across hinges 214.

Figure 24:
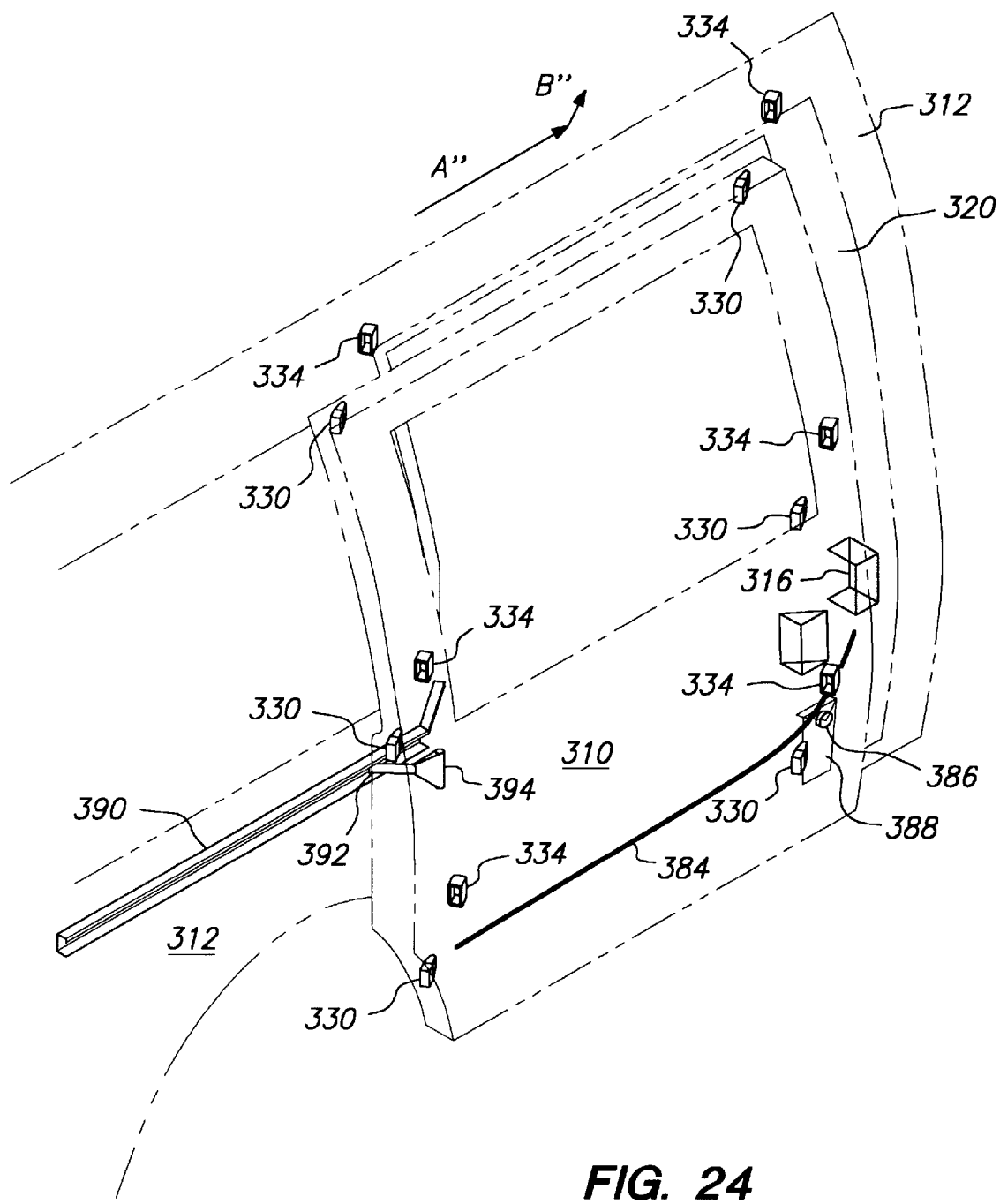
FIG. 24 is a perspective view showing a fourth embodiment of the present invention applied to a side, sliding door shown in the open position.
Figure 25:
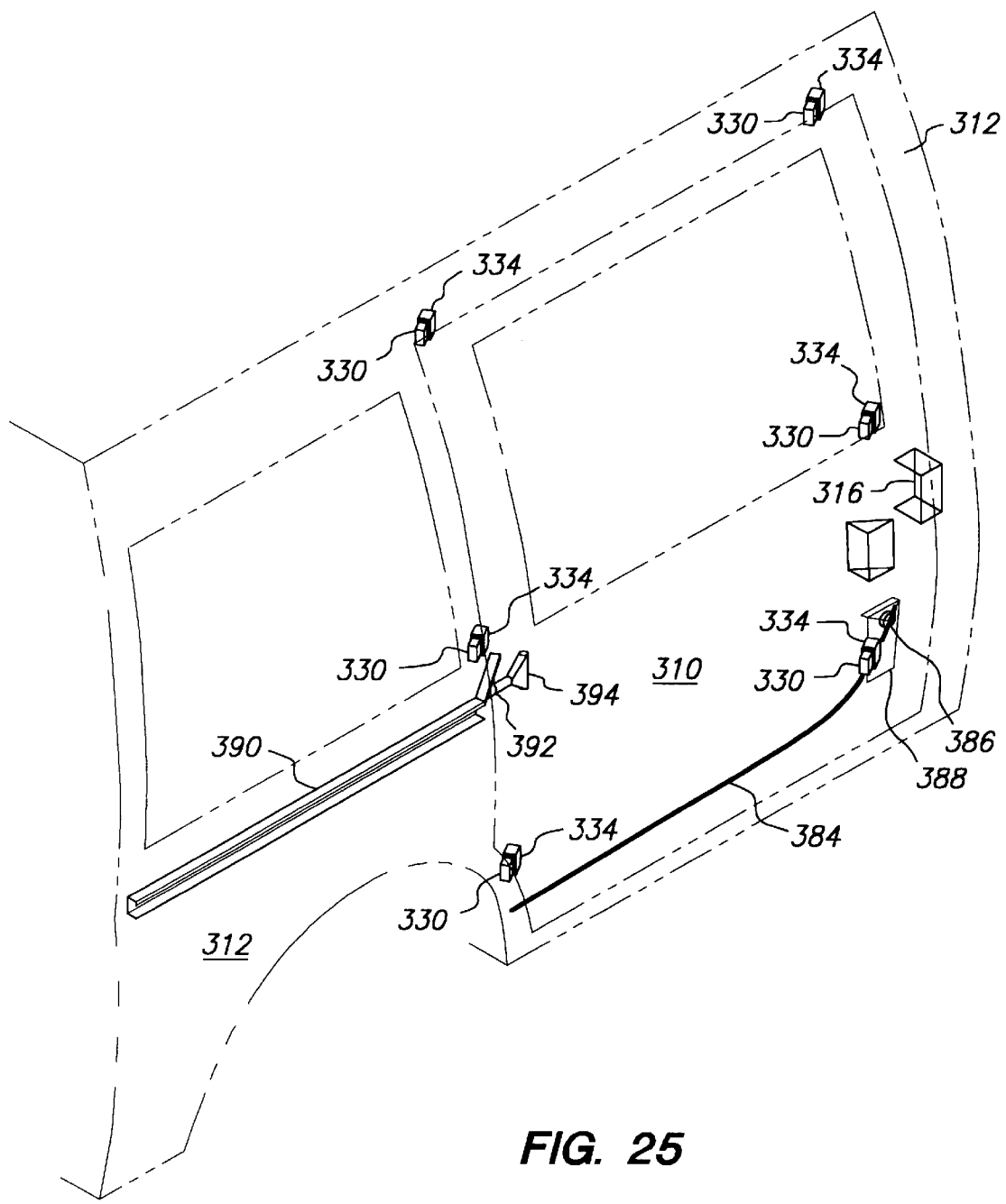
FIG. 25 is a perspective view of the fourth embodiment with the door shown in the closed position.

Referring to FIGS. 24 and 25, a forth embodiment is shown applying the door and chassis integration technology of the present invention to a horizontally sliding door, such as on the side of a van. This embodiment is similar to the previous embodiments, but because of the nature of the door mounting and travel path, there are no hinges to isolate and there is no need for special latches with ramps to raise the door upon closing.

Door 310 is slidably mounted to body 312 with a conventional roller track arrangement. Lower roller track 384 is located along the lower outer edge of the vehicle body 312 for receiving lower roller 386 which is attached to the lower edge of door 310 by rigid lower arm 388. Upper roller track 390 is located along the outer side of vehicle body 312 for receiving upper roller 392 which is attached to a mid-portion of the rear edge of door 312 by pivoting upper arm 394. The forward portions of lower track 384 and upper track 390 are curved or angled inward toward the center of the vehicle. With this conventional arrangement, door 310 slides forward along lower track 384 and upper track 390 in the direction of arrow A" from the open position to the closed position, and then travels at an inward angle as shown by arrow B" as it approaches the fully closed position.

Three structural keys 330 are located along the forward edge of door 310 and three keys 330 are located along the rearward edge for engagement with mating receptacles 334 located in door jamb 320. Keys 330 and receptacles 334 are angled inward to conform with the sliding path of door 310 when it is approaching the fully closed position. As with the previous embodiments, it is preferable that keys 330 and receptacles 334 are angled inward at 30 degrees to resist outward forces on the door and to provide a path for tension loads through door 310.

A conventional latching mechanism 316 on the forward edge of door 310 keeps the door closed and retains keys 330 within receptacles 334. Alternatively, a cable released latching mechanism can be employed, similar to the one used in the second and third embodiments, but without the lifting ramps 156 or 256.

In all of the above embodiments, proper alignment between keys 28 and 30 and receptacles 32 and 34 can be achieved by accurately locating these members during vehicle manufacture, or by adjustably mounting keys 28 and 30 to door 10 and or adjustably mounting receptacles 32 and 34 to door jamb 20. Alternatively and preferably, receptacles 32 and 34 can be formed from a hardenable resin that is injected into an oversized shell mounted to door jamb 20 when door 10 is closed and key 28 or 30 is protruding into the shell. This method is fully described in U.S. patent application Ser. No. 08/328,124, filed Oct. 20, 1994, incorporated herein by reference. Creating receptacles 32 and 34 in place from a hardenable resin has the advantage of not only positioning receptacles 32 and 34 accurately with respect to keys 28 and 30, but also is a more cost effective and accurate way of manufacturing receptacles that fit the keys exactly. This is particularly appropriate for the front receptacles 32 in the second embodiment above. Because these receptacles 32 are angled forward, angled upward, tightly curved, and are wedge shaped, they have a complex shape that would be difficult to machine and position to make a tight fit with forward keys 28.

The positions of keys 28 and 30 and receptacles 32 and 34 in the first embodiment may be interchanged if desired. In other words, door 10 may be structurally integrated with body 12 by locating keys 28 and 30 on door jamb 20 and locating receptacles 32 and 34 on door 10. The same is true for the second, third and fourth embodiments, but in the second and third embodiments it may not be desirable to have the cup shaped receptacles located on the door and oriented with their openings angled upward, as they may become clogged with foreign objects and debris.

The structural integration of a door panel with the chassis, as described above for a conventional door, a sliding van door, and a rear liftgate, may also be accomplished with other types of door panels, such as hoods, trunks, outwardly swinging rear van doors, and downwardly swinging tailgates. As with the above examples, it is preferable to locate structural keys adjacent to all of the corners of the door panel, and tie the keys together with structural members or door framework within the door panel. As described in the examples above, the keys engage mating receptacles which are structurally attached to the vehicle body or chassis. This allows compressive, tensile and torsional forces to be transmitted across the door panel opening when the door panel is closed. A lighter, stiffer and more completely enclosing vehicle chassis structure can thereby be provided when the door panel openings are releasably bridged by structural door panels. A particular advantage of applying the present invention to a truck is that a larger trunk opening can be created along the bottom rear edge so that cargo can be slid into the trunk at its floor level with no "lift over."

The above descriptions and drawings are for illustrative purposes only, and are not exhaustive of possible alternate embodiments of the invention. It is to be understood that the present invention is not limited to the sole embodiments described above and illustrated herein, but encompasses any and all variations falling within the scope of the appended claims.

What is claimed as the invention is:

1. An improved motor vehicle chassis comprising:
    a main chassis structure having a door opening therethrough;
    a door panel hingedly mounted to the chassis for alternately covering and uncovering the door opening;
    disengagable structural connections located, respectively, at opposite portions of the door panel, each of the connections including a structural key and a mating receptacle for receiving the structural key, each of the connections structurally connecting the door panel to the main chassis structure when the door panel is covering the door opening; and
    a structural member immovably mounted located on the door panel and rigidly spanning between the disengagable structural connections, the structural member and the disengagable structural connections cooperating to allow compressive, tensile and torsional forces to be transmitted through the main chassis structure across the door opening when covered by the door.

2. An improved motor vehicle chassis according to claim 1 wherein the door panel is a passenger door having forward and rearward edges and one of the structural connections is located adjacent to the forward edge of the door and another structural connection is located adjacent to the rearward edge of the door.

3. An improved motor vehicle chassis comprising:
    a main chassis structure having a door opening therethrough;
    a door panel hingedly mounted to the chassis for alternately covering and uncovering the door opening;
    disengagable structural connections located, respectively, at opposite portions of the door panel, each of the connections including a structural key and a mating receptacle for receiving the structural key, each of the connections structurally connecting the door panel to the main chassis structure when the door panel is covering the door opening; and
    a structural member located on the door panel rigidly spanning between the disengagable structural connections, the structural member and the disengagable structural connections cooperating to allow compressive, tensile and torsional forces to be transmitted through the main chassis structure across the door opening when covered by the door,
    wherein the door panel is a passenger door having forward and rearward edges and one of the structural connections is located adjacent to the forward edge of the door and another structural connection is located adjacent to the rearward edge of the door, and
    wherein the door is generally rectangular and has four corner areas and one of the structural connections is located adjacent to each of the corner areas.

4. An improved motor vehicle chassis according to claim 3 wherein the structural keys are rigidly attached to the door and the mating receptacles are rigidly attached to the main chassis structure adjacent to the door opening.

5. An improved motor vehicle chassis according to claim 3 further comprising a door catch located at the rearward edge of the door for engagement with an associated structural component on the chassis to retain the structural keys within the mating receptacles when the door is in a closed position.

6. An improved motor vehicle chassis according to claim 3 further comprising two door catches laterally spaced along the rearward edge of the door for engagement with two associated structural components on the chassis to retain the structural keys within the mating receptacles when the door is in a closed position.

7. An improved motor vehicle chassis comprising:
    a main chassis structure having a door opening therethrough;
    a door panel hingedly mounted to the chassis for alternately covering and uncovering the door opening;
    disengagable structural connections located, respectively, at opposite portions of the door panel, each of the connections including a structural key and a mating receptacle for receiving the structural key, each of the connections structurally connecting the door panel to the main chassis structure when the door panel is covering the door opening; and
    a structural member located on the door panel rigidly spanning between the disengagable structural connections, the structural member and the disengagable structural connections cooperating to allow compressive, tensile and torsional forces to be transmitted through the main chassis structure across the door opening when covered by the door,
    wherein the structural keys are pyramidical in shape, each having four tapered faces.

8. An improved motor vehicle chassis according to claim 7 wherein each of the tapered faces is oriented at an angle of twenty degrees in relation to an opposing tapered face.

9. An improved motor vehicle chassis according to claim 7 wherein two opposing tapered faces of at least one of the structural keys are curved to accommodate a pivoting action of the door.

10. An improved vehicle chassis comprising:
    a main chassis member having a door opening through a plane thereof;
    a door member mounted to the chassis for translatory lateral movement relative to the chassis member between an open position disposed outside the plane of the door opening and a closed position disposed within the opening, the door member covering the door opening when in the closed position;

inter-engageable connections fixed relative to the chassis and door members, said connections being located at opposite sides of the door opening and each comprising a key carried by one of the door and chassis members and a mating socket carried by the other of the members for mutual engagement with the socket when the door member is in the closed position to integrate the door member into the chassis as a structural part thereof.

11. An improved vehicle chassis according to claim 10 wherein the door member is mounted to the chassis for translatory lateral movement by a hinge connecting the chassis and door members.

12. An improved vehicle chassis according to claim 11 wherein the hinge mounts the door member for translatory lateral movement relative to the chassis about a generally vertical axis defined by the hinge.

13. An improved vehicle chassis according to claim 11 wherein the hinge mounts the door member for translatory lateral movement relative to the chassis about a generally horizontal axis defined by the hinge.

14. An improved vehicle chassis according to claim 10 wherein the keys and mating sockets are of a complementary pyramidical shape.

15. An improved vehicle chassis according to claim 10 wherein at least two spaced interengageable connections are carried by the chassis and door members on each of said opposite sides.

16. An improved vehicle chassis according to claim 10 wherein structural bracing for transmitting tension, compression, and torsional loads is incorporated into the door member between the interengageable connections.

17. An improved vehicle chassis according to claim 10 wherein:
the door member moves laterally along a longitudinal side of the vehicle and then moves at an inward angle as it approaches the closed position; and
the keys and mating sockets are oriented at the same inward angle that the door member moves in when it approaches the closed position.

18. An improved vehicle chassis according to claim 10 wherein the door member is mounted to the chassis member for translatory movement by structure comprising:
a roller track extending generally in a longitudinal direction along the vehicle chassis adjacent to a side of the vehicle, the roller track having a forward portion that extends inward toward the center of the vehicle away from the side; and
a roller element rotably mounted to the door member for rolling engagement with the roller track, the roller guiding the door member in a forward and inward direction towards the closed position.

19. An improved vehicle chassis comprising:
a main chassis member having a door opening through a plane thereof;
a door member mounted to the chassis for translatory lateral movement relative to the chassis member between an open position disposed outside the plane of the door opening and a closed position disposed within the opening; and
inter-engageable connections carried by the chassis and door members, said connections being located at opposite sides of the door opening and each comprising a key carried by one of the door and chassis members and a mating socket carried by the other of the members for mutual engagement with the socket when the door member is in the closed position to integrate the door member into the chassis as a structural part thereof, wherein the door member is mounted to the chassis for translatory lateral movement by a hinge connecting the chassis and door members, wherein the hinge mounts the door member for translatory lateral movement relative to the chassis about an axis defined by the hinge, and at least one of the connections is disposed adjacent the hinge, the mating key and socket of said one connection extending in a curvilinear path generally concentric with the axis of the hinge.

20. An improved vehicle chassis comprising:
a main chassis member having a door opening through a plane thereof;
a door member mounted to the chassis for translatory lateral movement relative to the chassis member between an open position disposed outside the plane of the door opening and a closed position disposed within the opening; and
inter-engageable connections carried by the chassis and door members, said connections being located at opposite sides of the door opening and each comprising a key carried by one of the door and chassis members and a mating socket carried by the other of the members for mutual engagement with the socket when the door member is in the closed position to integrate the door member into the chassis as a structural part thereof, wherein the door member is mounted to the chassis for translatory lateral movement by a hinge connecting the chassis and door members, and wherein:
the hinge mounts the door member for translatory lateral movement relative to the chassis about an axis defined by the hinge;
the hinge comprises a chassis portion attached to the vehicle chassis and a door portion attached to the door;
the chassis and door portions are pivotably connected together to mount the door member for translatory lateral movement about the hinge axis; and
the vehicle chassis includes disconnecting means for physically separating the door and chassis portions of the hinge so that any disturbing forces which may be generated between the door hinges and the keys and sockets are not transmitted between the door and chassis portions when the door member is in the closed position.

21. An improved vehicle chassis according to claim 20 wherein the disconnecting means comprises a ramp member for moving the door member in a direction parallel to the hinge axis while the door member pivots about the hinge axis.

22. An improved vehicle chassis according to claim 20 wherein the disconnecting means comprises a ramp member for moving the door member in a direction perpendicular to the hinge axis while the door member pivots about the hinge axis.

23. An improved vehicle chassis comprising:
a main chassis member having a door opening through a plane thereof;
a door member mounted to the chassis for translatory lateral movement relative to the chassis member between an open position disposed outside the plane of the door opening and a closed position disposed within the opening; and inter-engageable connections carried by the chassis and door members, said connections being located at opposite sides of the door opening and each comprising a key carried by one of the door and chassis members and a mating socket carried by the other of the members for mutual engagement with the socket when the door member is in the closed position to integrate the door member into the chassis as a structural part thereof, wherein the door member is mounted to the chassis for translatory lateral movement by a hinge connecting the chassis and door members, wherein the hinge mounts the door member for translatory lateral movement relative to the chassis about an axis defined by the hinge, and the mating sockets are mounted at an inclined angle such that the keys simultaneously move in a direction perpendicular to the hinge axis and in a direction parallel to the hinge axis when the keys engage the mating sockets.

24. An improved vehicle chassis comprising:

a main chassis member having a door opening through a plane thereof;

a door member mounted to the chassis for translatory lateral movement relative to the chassis member between an open position disposed outside the plane of the door opening and a closed position disposed within the opening; and inter-engageable connections carried by the chassis and door members, said connections being located at opposite sides of the door opening and each comprising a key carried by one of the door and chassis members and a mating socket carried by the other of the members for mutual engagement with the socket when the door member is in the closed position to integrate the door member into the chassis as a structural part thereof, wherein the mating keys and sockets have mutually engageable surfaces extending at an angle relative to the plane of the door opening such that tension and compression forces imparted to the chassis are transmitted to the door member when in the closed position.

25. In combination with a door member hingedly secured to a vehicle chassis member for pivotal movement about an axis between open and closed positions relative to a door opening within the chassis member, an improved connection for transmitting forces to the door member from the chassis member when the door member is in the closed position, said connection comprising mating key and socket members carried by the door and chassis members for mutual engagement when the door is in the closed position, said key and socket members extending in a curvilinear path generally concentric with said axis.

26. In a combination according to claim 25, the improved connection wherein the key and socket members are of a complementary pyramidical shape.

27. In a combination according to claim 25, the improved connection wherein the mating key and socket members have mutually engageable surfaces extending at an angle relative to the door opening such that tension and compression forces imparted to the chassis are transmitted to the door member when in the closed position.

28. In combination with a door member hingedly secured to a vehicle chassis member for pivotal movement about an axis between open and closed positions relative to a door opening within the chassis member, an improved method for transmitting forces to the door member from the chassis member when the door is in the closed position, said method comprising providing mating key and socket members carried by the door and chassis members for mutual engagement when the door is in the closed position, said key and socket members extending in a curvilinear path generally concentric about said axis.

29. In a combination according to claim 28, the improved method wherein mating key and socket members are provided at opposite sides of the door opening for mutual engagement when the door member is in the closed position and at least certain of said mating key and socket members are adjacent said axis and extend in a curvilinear path generally concentric with said axis.

30. In a combination according to claim 29, the improved method wherein the mating key and socket members have mutually engageable surfaces extending at an angle relative to the door opening such that tension and compression forces imparted to the chassis are transmitted to the door member when in the closed position.

* * * * *